US008625513B2

United States Patent
Seo et al.

(10) Patent No.: US 8,625,513 B2
(45) Date of Patent: Jan. 7, 2014

(54) METHOD FOR TRANSMITTING CONTROL INFORMATION TO REQUEST CHANNEL QUALITY INDICATOR IN A WIRELESS COMMUNICATION SYSTEM SUPPORTING MULTIPLE TRANSMISSION BANDWIDTHS

(75) Inventors: Dong Youn Seo, Anyang-si (KR); Jung Hoon Lee, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 13/142,539

(22) PCT Filed: Dec. 29, 2009

(86) PCT No.: PCT/KR2009/007858
§ 371 (c)(1),
(2), (4) Date: Jun. 28, 2011

(87) PCT Pub. No.: WO2010/077051
PCT Pub. Date: Jul. 8, 2010

(65) Prior Publication Data
US 2011/0268067 A1    Nov. 3, 2011

Related U.S. Application Data

(60) Provisional application No. 61/141,211, filed on Dec. 29, 2008.

(30) Foreign Application Priority Data

Dec. 22, 2009    (KR) ........................ 10-2009-0128759

(51) Int. Cl.
*H04W 4/00* (2009.01)
(52) U.S. Cl.
USPC ............ 370/329; 370/252; 370/333; 455/450

(58) Field of Classification Search
USPC .............. 370/230.1, 329, 331, 332, 431, 465, 370/328, 333; 455/450
See application file for complete search history.

(56) References Cited

U.S. PATENT DOCUMENTS

2007/0254595 A1    11/2007  Yoon et al.
2007/0293230 A1*   12/2007  Lee ............................... 455/450
(Continued)

FOREIGN PATENT DOCUMENTS

KR    10-2005-0078640 A    8/2005
KR    10-2007-0046647 A    5/2007
(Continued)

OTHER PUBLICATIONS

3GPP TS 36.213, 3rd Generation Partnership Project;Technical Specification Group Radio Access Network; Evolved Universal Terrestrial Radio Access (E-UTRA); Physical layer procedures (Release 8), 2008.*

*Primary Examiner* — Jeffrey M Rutkowski
*Assistant Examiner* — Harun Chowdhury
(74) *Attorney, Agent, or Firm* — Birch, Stewart, Kolasch & Birch, LLP (57) ABSTRACT

A method for transmitting control information to request a Channel Quality Indicator (CQI) in a wireless communication system supporting a plurality of transmission bands is disclosed. The method includes generating control information including downlink transmission band indication information and CQI request information, the downlink transmission band indication information indicating a downlink transmission band requiring CQI reporting among a plurality of downlink transmission bands and the CQI request information requesting CQI reporting for the downlink transmission band, and transmitting the generated control information on a downlink control channel of a predetermined downlink transmission band among the plurality of downlink transmission bands.

8 Claims, 8 Drawing Sheets

(56) References Cited

U.S. PATENT DOCUMENTS

| | | | |
|---|---|---|---|
| 2009/0046582 A1* | 2/2009 | Sarkar et al. | 370/230.1 |
| 2009/0168718 A1* | 7/2009 | Wang et al. | 370/330 |
| 2009/0175232 A1* | 7/2009 | Kolding | 370/329 |
| 2010/0246499 A1 | 9/2010 | Kim et al. | |
| 2011/0021230 A1* | 1/2011 | Moberg et al. | 455/507 |
| 2011/0134780 A1* | 6/2011 | Jersenius et al. | 370/252 |

FOREIGN PATENT DOCUMENTS

| | | |
|---|---|---|
| KR | 10-2007-0121589 A | 12/2007 |
| WO | WO 2007/052917 A1 | 5/2007 |

* cited by examiner

METHOD FOR TRANSMITTING CONTROL INFORMATION TO REQUEST CHANNEL QUALITY INDICATOR IN A WIRELESS COMMUNICATION SYSTEM SUPPORTING MULTIPLE TRANSMISSION BANDWIDTHS

CROSS REFERENCE TO RELATED APPLICATIONS

This application is the National Phase of PCT/KR2009/007858 filed on Dec. 29, 2009, which claims priority under 35 U.S.C. 119(e) to U.S. Provisional Application No. 61/141,211 filed on Dec. 29, 2008 and under 35 U.S.C. 119(a) to Patent Application No. 10-2009-0128759 filed in Republic of Korea on Dec. 22, 2009, all of which are hereby expressly incorporated by reference into the present application.

TECHNICAL FIELD

The present invention relates to a method for transmitting control information to request a Channel Quality Indicator (CQI) in a wireless communication system supporting a plurality of transmission bandwidths.

BACKGROUND ART (1) Multiple Input Multiple Output (MIMO) Technology

The term "MIMO" is short for Multiple Input Multiple Output. Beyond conventional schemes using a single Transmit (Tx) antenna and a single Reception (Rx) antenna, MIMO uses a plurality of Tx antennas and a plurality of Rx antennas to thereby increase the transmission and reception efficiency of data. With the use of multiple antennas at a transmitter or a receiver, MIMO seeks to increase capacity or improve performance in a wireless communication system. The term "MIMO" is interchangeable with "multi-antenna".

The MIMO technology does not depend on a single antenna path to receive an entire message. Rather, it completes the message by combining data fragments received through a plurality of antennas. Because MIMO may increase data rate within a certain area or extend system coverage at a given data rate, it is considered as a promising future-generation mobile communication technology that may find its use in a wide range including mobile terminals, relays, etc. With the growth of data communication, MIMO is attracting attention as a future-generation technology that may overcome a limit on transmission capacity that is almost reached due to the increased data communication.

(2) MIMO System Model

Figure 1:
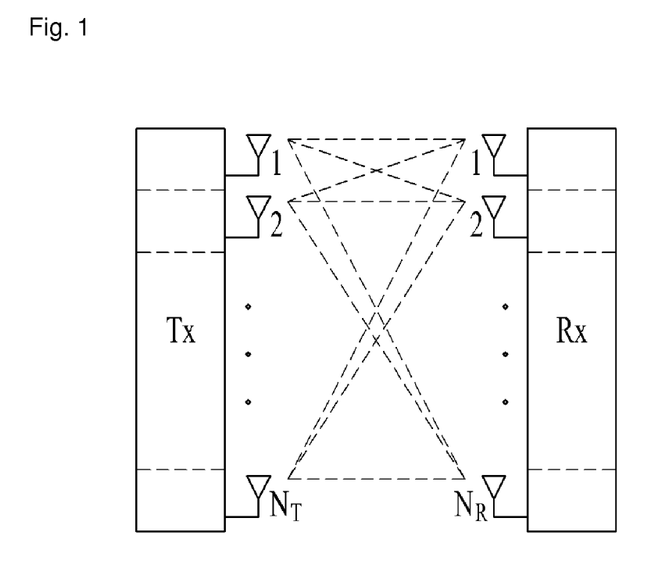
FIG. 1 illustrates the configuration of a typical Multiple Input Multiple Output (MIMO) communication system.

FIG. 1 illustrates the configuration of a typical MIMO communication system. Referring to FIG. 1, a simultaneous increase in the number of Tx antennas of a transmitter to $N_T$ and in the number of Rx antennas of a receiver to $N_R$ increases a theoretical channel transmission capacity in proportion to the number of antennas, compared to use of a plurality of antennas at only one of the transmitter and the receiver. Therefore, transmission rate and frequency efficiency are remarkably increased. Given a maximum transmission rate $R_o$ that may be achieved in case of a single antenna, the increase of channel transmission capacity may increase the transmission rate, in theory, to the product of $R_o$ and $R_i$ in case of multiple antennas. $R_i$ is a transmission rate increase rate.

MathFigure 1

$$R_i = \min(N_T, N_R) \qquad [\text{Math.1}]$$

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards for $3^{rd}$ Generation (3G) mobile communications, future-generation Wireless Local Area Network (WLAN), etc.

Concerning the research trend of MIMO, active studies are underway in many respects of MIMO, inclusive of studies of information theories related to calculation of multi-antenna communication capacity in diverse channel environments and multiple access environments, studies of measuring MIMO radio channels and MIMO modeling, studies of time-space signal processing techniques to increase transmission reliability and transmission rate, etc.

To describe a communication scheme in a MIMO system in detail, the following mathematical model may be used. It is assumed that there are $N_T$ Tx antennas and $N_R$ Rx antennas as illustrated in FIG. 1. Regarding a transmission signal, up to $N_T$ pieces of information can be transmitted through the $N_T$ Tx antennas, as expressed as the following vector.

MathFigure 2

$$s = [s_1, s_2, \ldots, s_{N_T}]^T \qquad [\text{Math.2}]$$

A different transmit power may be applied to each piece of transmission information $$s_1, s_2, \ldots, s_{N_T}.$$

Let the transmit power levels of the transmission information be denoted by $$P_1, P_2, \ldots, P_{N_T}.$$

respectively. Then the power-controlled transmission information $$\hat{s}$$

may be given as the following Math FIG. 3.

MathFigure 3

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad [\text{Math.3}]$$

$$\hat{s}$$

may be expressed as a diagonal matrix

P of transmit power.

MathFigure 4

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad [\text{Math. 4}]$$

Meanwhile, actual $N_T$ transmitted signals $$x_1, x_2, \ldots, x_{N_T}$$

may be configured by applying a weight matrix

W to the power-controlled information vector $$\hat{s}.$$

The weight matrix

W functions to appropriately distribute the transmission information to the Tx antennas according to transmission channel statuses, etc. These transmitted signals $x_1, x_2, \ldots, x_{N_T}$ are represented as a vector $X$, which may be determined as
MathFigure 5

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_t} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Math. 5]}$$

$W_{ij}$ denotes a weight for a $j^{th}$ piece of information transmitted through an $i^{th}$ Tx antenna.

$W$ is also referred to as a precoding matrix.
Given $N_R$ Rx antennas, signals received at the Rx antennas, $y_1, y_2, \ldots, y_{N_R}$ may be represented as the following vector.
MathFigure 6

$$y = [y_1, y_2, \ldots, y_{N_R}]^T \quad \text{[Math.6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and a matrix by grouping them. The vector representation of channels may be carried out in the following manner.

Figure 2:
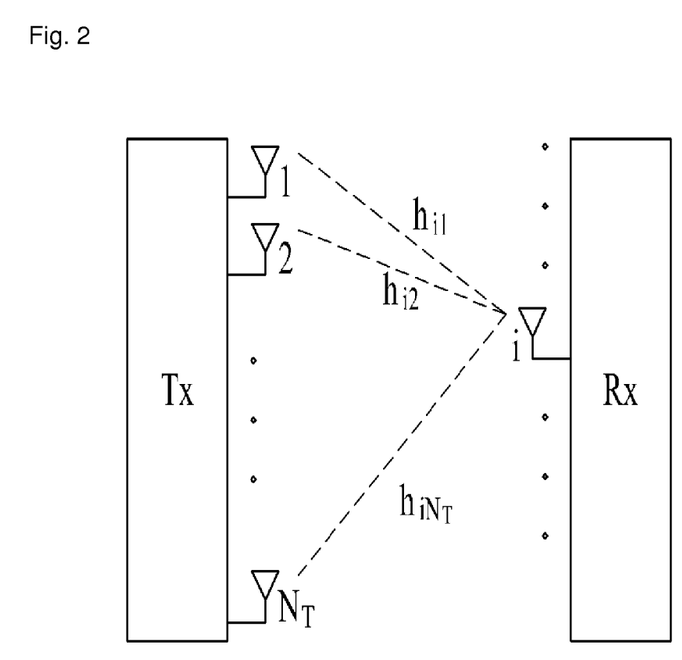
FIG. 2 illustrates channels from $N_T$ Transmission (Tx) antennas to an $i^{th}$ Reception (Rx) antenna.

FIG. 2 illustrates channels from $N_T$ Tx antennas to an $i^{th}$ Rx antenna.

Referring to FIG. 2, the channels from the $N_T$ Tx antennas to the $i^{th}$ Rx antenna may be expressed as the following Math FIG. 7.
MathFigure 7

$$H_i^T = [h_{i1}, h_{i2}, \ldots h_{iN_T}] \quad \text{[Math.7]}$$

Also, all channels from $N_T$ Tx antennas to $N_R$ Rx antennas may be expressed as the following matrix.
MathFigure 8

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Math. 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.
MathFigure 9

$$n = [n_1, n_2, \ldots, n_{N_R}]^T \quad \text{[Math.9]}$$

From the above modeled equations, the received signal is given as
MathFigure 10

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Math. 10]}$$

$Hx + n$ (3) Channel Quality Indicator (CQI)

For efficient communication, it is necessary to feed back channel information. In general, information about a downlink channel is transmitted on an uplink and information about an uplink channel is transmitted on a downlink. This channel information is called a CQI. The CQI may be generated in various manners.

For example, the CQI generation methods may include transmitting quantized channel state information a CQI, transmitting the Signal to Interference and Noise Ratio (SINR) of a channel as a CQI, and transmitting information indicating how a channel is actually used, such as a Modulation and Coding Scheme (MCS) level, as a CQI.

Many of the CQI generation methods generate a CQI based on an MCS. For example, a CQI is generated based on an MCS in $3^{rd}$ Generation Partnership Project (3GPP) High Speed Downlink Packet Access (HSDPA). An MCS specifies a modulation scheme, a coding scheme, and a coding rate. Therefore, a CQI is changed if a modulation scheme and a coding scheme are changed and thus at least one CQI is required per codeword.

In a MIMO system, the number of required CQIs is changed. As the MIMO system generates multiple channels through multiple antennas, a plurality of codewords is available. Accordingly, a plurality of CQIs should be reported, thus increasing the amount of control information proportionally.

Figure 3:
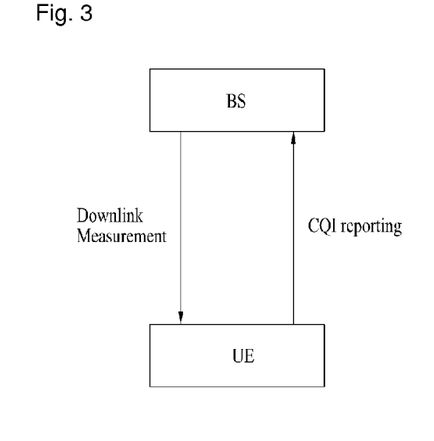
FIG. 3 illustrates the concept of Channel Quality Indicator (CQI) generation and CQI reporting.

FIG. 3 illustrates the concept of CQI generation and CQI reporting. A User Equipment (UE) measures a downlink channel quality and reports a CQI value selected based on the downlink channel quality measurement to a Base Station (BS) on an uplink control channel. The BS performs downlink scheduling based on CQI reports received from UEs. The downlink scheduling involves selecting a UE and allocating resources to the selected UE. A CQI value may be any of SINR, Carrier to Interference and Noise Ratio (CINR), Bit Error Rate (BER), and Frame Error rate (FER). Alternatively, the CQI value may be a transmittable value as which one of the SINR, CINR, BER and FER is expressed. In the MIMO system, Rank Indicator (RI), Precoding Matrix Index (PMI), etc. may be added as channel state information.

(4) Characteristics of CQI in Frequency Band

In mobile communication systems, an MCS and transmit power are controlled for a given channel by link adaptation in order to fully utilize the capacity of the channel. To allow the BS to perform the link adaptation, the UE should feed back a CQI to the BS.

If a system frequency band has a bandwidth wider than a coherence bandwidth, a channel is changed greatly within one bandwidth. Particularly, a multi-carrier system such as an Orthogonal Frequency Division Multiplexing (OFDM) system uses a plurality of subcarriers in a given bandwidth and a modulated symbol is transmitted on every subcarrier. While it is optimal to transmit a channel per subcarrier, the amount of feedback channel information rapidly increases. In this context, many schemes have been proposed to reduce the control overhead.

(5) Concept of Multi-Carrier

Figure 4:
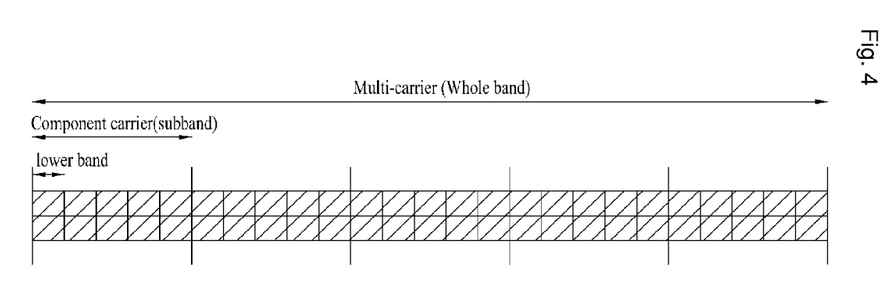
FIG. 4 illustrates a frequency band in a multi-carrier system.

The concept of multi-carrier and Component Carrier (CC) will be described below. FIG. 4 illustrates a frequency band in a multi-carrier system. Referring to FIG. 4, the multi-carrier represents a total frequency band available to a BS, equivalent to a whole band in its meaning. For example, the multi-carrier may be 100 MHz.

A CC is an element of the multi-carrier. That is, a plurality of CCs form the multi-carrier by carrier aggregation. The CC includes a plurality of lower bands. If a multi-carrier is called a whole band, a CC may be referred to as a subband and a lower band may be referred to as a partial band. Carrier aggregation is intended to extend a bandwidth by aggregating a plurality of carriers in order to increase data rate. For example, a legacy system uses a carrier of 20 MHz and the bandwidth of the carrier may be extended up to 100 MHz by aggregating five 20-MHz carriers. The term "carrier aggregation" covers aggregating carriers in different frequency bands.

How to report the above-described CQI in the multi-carrier system becomes an issue to be solved.

DISCLOSURE OF INVENTION

Technical Problem

An object of the present invention devised to solve the problem lies on a method for transmitting control information to request a CQI in a wireless communication system supporting a plurality of transmission bandwidths.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method for transmitting control information to request a CQI in a wireless communication system supporting a plurality of transmission bands, which includes generating control information including downlink transmission band indication information and CQI request information, the downlink transmission band indication information indicating a downlink transmission band requiring CQI reporting among a plurality of downlink transmission bands and the CQI request information requesting CQI reporting for the downlink transmission band, and transmitting the generated control information on a downlink control channel of a predetermined downlink transmission band among the plurality of downlink transmission bands.

In another aspect of the present invention, provided herein is a method for transmitting CQI information in a wireless communication system supporting a plurality of transmission bands, including receiving from a BS control information including CQI request information requesting CQI reporting and an uplink grant for uplink scheduling on a downlink control channel of one of a plurality of downlink transmission bands, and transmitting CQI information for the downlink transmission band on an uplink shared channel of an uplink transmission band indicated by the uplink grant among a plurality of uplink transmission bands.

In another aspect of the present invention, provided herein is a method for transmitting CQI information in a wireless communication system supporting a plurality of transmission bands, which includes receiving from a BS control information including CQI request information requesting CQI reporting and an uplink grant for uplink scheduling on a downlink control channel in one of a plurality of downlink transmission bands, and transmitting CQI information for a downlink transmission band corresponding to an uplink transmission band indicated by the uplink grant on an uplink shared channel of the uplink transmission band.

In another aspect of the present invention, provided herein is a BS in a wireless communication system supporting a plurality of transmission bands, which includes a processor unit for generating control information including downlink transmission band indication information and CQI request information, the downlink transmission band indication information indicating a downlink transmission band requiring CQI reporting among a plurality of downlink transmission bands and the CQI request information requesting CQI reporting for the downlink transmission band, and an RF unit electrically connected to the processor unit, for transmitting the generated control information on a downlink control channel of a predetermined downlink transmission band among the plurality of downlink transmission bands.

In another aspect of the present invention, provided herein is a UE in a wireless communication system supporting a plurality of transmission bands, which includes a receiver for receiving from a BS control information, which includes CQI request information requesting CQI reporting and an uplink grant for uplink scheduling on a downlink control channel of one of a plurality of downlink transmission bands, a processor electrically connected to the receiver, for generating CQI information for the downlink transmission band, and a transmitter electrically connected to the processor, for transmitting the CQI information on an uplink shared channel indicated by the uplink grant.

In a further aspect of the present invention, provided herein is a UE in a wireless communication system supporting a plurality of transmission bands, which includes a receiver for receiving from a BS control information including CQI request information requesting CQI reporting and an uplink grant for uplink scheduling on a downlink control channel in one of a plurality of downlink transmission bands, a processor electrically connected to the receiver, for generating CQI information for a downlink transmission band corresponding to an uplink transmission band indicated by the uplink grant, and a transmitter electrically connected to the processor, for transmitting the CQI on an uplink shared channel of the uplink transmission band.

Advantageous Effects of Invention

According to the present invention, signaling can be effectively configured, when control information is transmitted to request CQI reporting in a multi-carrier system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following description includes specific details in order to provide a thorough understanding of the present invention. However, it will be apparent to those skilled in the art that the present invention may be practiced without such specific details. The same reference numbers will be used throughout this specification to refer to the same or like parts.

Before describing methods for reporting a CQI in a multi-carrier system according to the present invention, a description will first be made of CQI generation schemes.

(1) CQI Generation Schemes

Along with the increase of channel information in amount, control signaling is also increased. To reduce the control overhead, a CQI is generated in the manner that reduces the information amount of the CQI. For this purpose, the following CQI generation schemes have been designed.

One of the CQI generation schemes is to change a unit about which a CQI is transmitted. In an Orthogonal Frequency Division Multiplexing (OFDM) system, for example, a CQI is transmitted on a subcarrier group basis instead of transmitting a CQI for every subcarrier. Given a total of 2048 subcarriers, the subcarriers are grouped into 171 subcarrier groups each including 12 subcarriers. As a consequence, the number of actually transmitted CQIs decreases from 2048 to 171.

In the case where a frequency band is divided into an integer number of subcarriers as in OFDM, the subcarriers are grouped into subcarrier groups each including one or more subcarriers and a CQI is reported on a subcarrier group basis. Thus a basic CQI reporting unit may be a subcarrier group which is defined as a CQI subcarrier group in the present invention. On the other hand, in the case where a frequency band is not divided into subcarriers, the total frequency band is divided into subbands and a CQI is generated on a subband basis. Thus, a basic CQI reporting unit may be a subband which is defined as a CQI subband in the present invention.

Another CQI generation scheme is to generate a CQI by compressing channel information. For example, channel information per subcarrier is compressed by a certain compression method in the OFDM system. The compression method may be a Discrete Cosign Transform (DCT), etc.

A third CQI generation scheme is to generate a CQI for a selected frequency band. For example, in the OFDM system, M best subcarriers or subcarrier groups are selected from among total subcarriers or subcarrier groups and CQIs concerning the M best subcarriers or subcarrier groups are transmitted, rather than a CQI is transmitted for every subcarrier. This scheme is called a Best-M scheme.

When a CQI is transmitted for a selected frequency band, two information parts are actually transmitted, a CQI value and a CQI index.

(2) Generation of CQIs for Selected Frequency Bands

Figure 5:
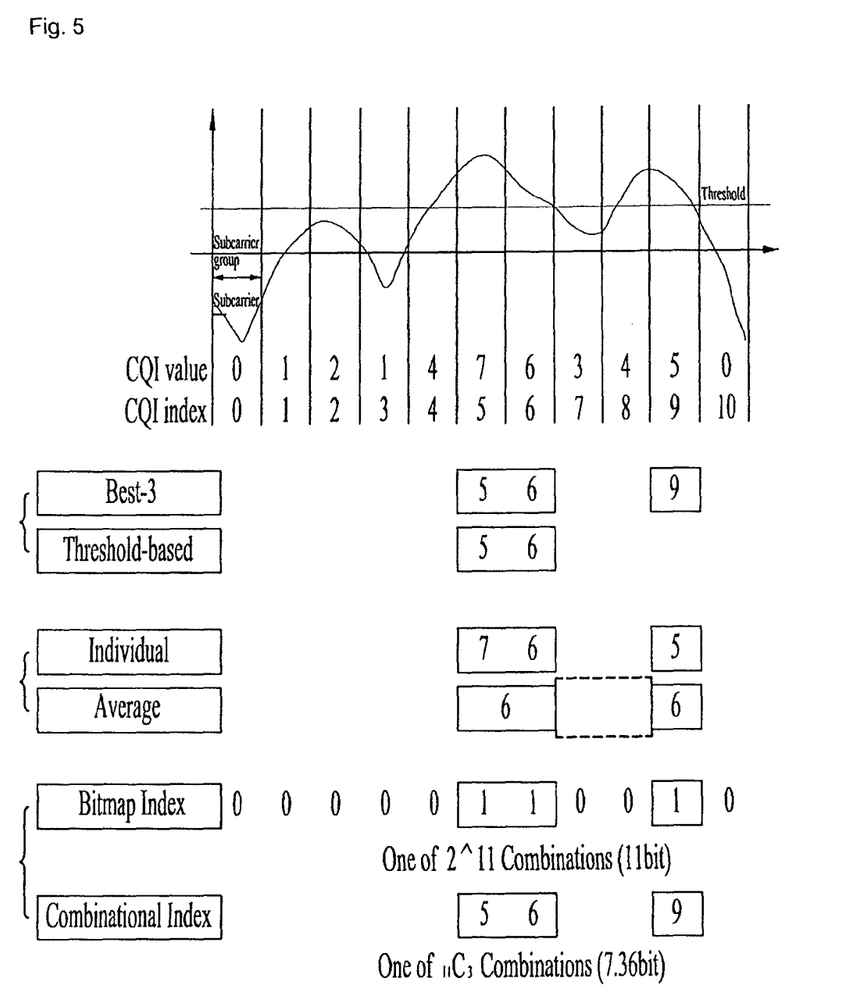
FIG. 5 illustrates a method for selecting CQI subbands in the frequency domain and generating CQIs for the selected CQI subbands.

FIG. 5 illustrates a method for selecting CQI subbands in the frequency domain and generating CQIs for the selected CQI subbands. The frequency band-selective CQI generation involves three steps on the whole.

In Step 1, frequency bands for which CQIs are to be generated, that is, CQI subbands are selected. Then CQI values are generated for the selected CQI subbands and transmitted in Step 2 and the indexes of the selected CQI subbands are transmitted in Step 3.

In FIG. 5, the Best-M scheme and a threshold-based scheme are presented as examples of selecting CQI subbands. The Best-M scheme selects M CQI subbands in good channel status. In the illustrated case of FIG. 5, CQI subbands with indexes 5, 6 and 9 in good channel status are selected according to a Best-3 scheme. Meanwhile, the threshold-based scheme selects CQI subbands in channel statuses exceeding a predetermined threshold. It is shown in FIG. 5 that CQI subbands with indexes 5 and 6 in channel statuses exceeding a threshold are selected.

As examples of generating and transmitting CQI values, an individual transmission scheme and an average transmission scheme are illustrated in FIG. 5. CQI values for the selected CQI subbands are all transmitted in the individual transmission scheme. Therefore, as more CQI subbands are selected, more CQI values are transmitted. Meanwhile, the average transmission scheme is to transmit the average of CQI values for the selected CQI subbands. Thus despite the advantage of transmission of a single CQI value irrespective of the number of selected CQI subbands, CQI accuracy is decreased. The average of CQI values may be an arithmetic average or a channel capacity-based average.

A bitmap index scheme and a combinatorial index scheme are illustrated as examples of transmitting the indexes of the CQI subbands in FIG. 5. In the bitmap index scheme, one bit is mapped to each CQI subband. The bit is set to 1 for a selected CQI subband and to 0 for a non-selected CQI subband. The bitmap index scheme requires as many bits as total CQI subbands and thus a bitmap is represented always in the same number of bits irrespective of the number of selected CQI subbands. Compared to the bitmap index scheme, the number of selected CQI subbands is determined and then each of all possible cases that may be produced by combining as many CQI subbands as the determined number is mapped to an index in the combinatorial index scheme.

More specifically, given a total of N CQI subbands, if M CQI subbands are selected, the total number of possible combinations each having M CQI subbands is calculated by MathFigure 11

$$_NC_M = \frac{N!}{(N-M)!M!}$$ [Math. 11]

The number of bits required to represent as many combination cases as the number determined by [Equation 11] is given as MathFigure 12

$$\lceil \log_2(_NC_M) \rceil = \left\lceil \log_2\left(\frac{N!}{(N-M)!M!}\right) \right\rceil$$ [Math. 12]

where $\lceil \ \rceil$ represents a ceiling function.

In FIG. 5, three CQI subbands are selected from among 11 CQI subbands in total and thus the number of possible combinations each having three CQI subbands is $_{11}C_3=165$ that satisfies $2^7 \leq {}_{11}C_3 \leq 2^8$.

Hence, eight bits are needed to represent the 165 combinations.

CQIs may increase in number in various dimensions, causing a great overhead, which will be described below.

(3) Increase of CQIs in Number in Many Domains

Regarding an increase in the number of CQIs in the spatial domain, when a MIMO system transmits a plurality of codewords through a plurality of layers, a plurality of CQIs is required accordingly. For example, up to two codewords are available and thus two CQIs are needed in a $3^{rd}$ Generation Partnership Project Long Term Evolution (3GPP LTE)-MIMO system. Assuming that one CQI occupies 4 bits and two codewords exist, CQIs require a total of 8 bits. Because every UE that should report its channel status transmits 8 bits of CQIs, a huge amount of resources are used from the viewpoint of overall radio resources. Hence, it is preferable in terms of channel capacity to minimize the number of CQIs.

Regarding an increase in the number of CQIs in the frequency domain, a CQI is for one frequency band in the above description. If a receiver selects the best frequency band, that is, a frequency band in the best channel status and transmits a CQI for the selected frequency band, a transmitter services the receiver in the frequency band. In this case, a CQI is required for only one frequency band. While this CQI transmission scheme is suitable for a single-user environment, a more efficient CQI transmission scheme is needed for a multi-user environment.

A problem encountered with scheduling in case of transmission of a CQI for only one preferred frequency band will be described in detail. If multiple users prefer different frequency bands, it does not matter. However, if the users select the same frequency band as their best one, the other users except for a selected user do not use the frequency band. When each user is supposed to transmit a CQI for only one preferred frequency band, service opportunities are not given to unselected users. To avert this problem and effectively achieve a multi-user diversity gain, CQIs need to be transmitted for a plurality of frequency bands, thus increasing the information amount of CQIs by as much as the number of the selected frequency bands. For example, assuming that three best frequency bands are selected and CQIs and frequency band indicators are transmitted for the three frequency bands, a three-fold increase occurs in the amount of information of CQIs and the frequency band indicators indicating the selected frequency bands are additionally transmitted.

The number of CQIs may be increased in the space-frequency domain. That is, a plurality of CQIs in the spatial domain and a plurality of CQIs in the frequency domain may be required.

An increase in the number of CQIs in any other domain may be considered. For instance, in Code Division Multiple Access (CDMA), signal strength and interference vary with each spreading code and thus a CQI may be considered on a spreading code basis. In other various dimensions, an increase in the number of CQIs may be considered.

As an approach to reduction of the information amount of CQIs when a plurality of CQIs is transmitted, the concept of differential CQI will be described. The differential CQI scheme transmits one full CQI and a differential CQI for another CQI, which is the difference between the CQI and the full CQI. The differential CQI transmission is similar to differential modulation.

(4) Differential CQI

Many cases of requiring a plurality of CQIs in various domains have been described before. To reduce the amount of information transmitted in the plurality of CQIs, the concept of differential CQI may be applied. One reference CQI is selected and transmitted fully, while for other CQIs, the differences between the CQIs and the reference CQI, that is, differential CQIs are transmitted. The differential CQI scheme is similar to differential modulation. In general, a differential CQI occupies a fewer bits than a reference CQI. As a result, the total amount of information transmitted in the CQIs may be reduced.

Now a description will be made below of CQI transmission modes.

(5) CQI Transmission Modes

The following uplink channels listed in Table 1 below are used for CQI transmission in a legacy system.

TABLE 1

| Scheduling Type | Periodic CQI transmission | Non-periodic CQI transmission |
|---|---|---|
| Non-frequency-selective | PUCCH | — |
| Frequency-selective | PUCCH | PUSCH |

As noted from Table 1, a CQI may be transmitted on a Physical Uplink Control CHannel (PUCCH) at every interval predetermined by a higher layer, or on a PUSCH non-periodically when a scheduler needs. The CQI transmission on a PUSCH is available only in a frequency-selective case.

Periodic or non-periodic CQI transmission will be described below.

1) Transmission of CQI/PMI/RI on PUSCH after Receiving CQI Request

This kind of CQI transmission takes place when a CQI request is included in an uplink grant for PUSCH scheduling, received on a Physical Downlink Control CHannel (PDCCH). Table 2 below illustrates CQI/PMI/RI transmission modes on a PUSCH.

TABLE 2

| | | PMI Feedback Type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The CQI transmission modes illustrated in Table 2 are selected by the higher layer and a CQI, a PMI and an RI are all transmitted in the same PUSCH subframe.

1-1) Mode 1-2

On the assumption that data is transmitted only in each subband, a precoding matrix is selected.

A UE generates a wideband CQI for a total system frequency band or a frequency band set by the higher layer based on the selected precoding matrix.

The UE transmits the wideband CQI and PMIs for the respective subbands. The bandwidth of each subband may vary with the bandwidth of the system frequency band.

1-2) Mode 2-0

The UE selects M preferred subbands from the system frequency band or the higher layer-set frequency band.

The UE generates one CQI on the assumption that data is transmitted in the selected M subbands.

In addition, the UE generates one wideband CQI for the system frequency band or the higher layer-set frequency band.

If a plurality of codewords is transmitted in the M subbands, a CQI for each codeword is a differential value. The differential CQIs are the differences between indexes of CQI values for the M subbands and an index of the wideband CQI.

The UE transmits information about the positions of the M subbands, the single CQI value for the M subbands, and the wideband CQI value for the system frequency band or the higher layer-set frequency band. The bandwidth of each subband and the M value may vary with the bandwidth of the system frequency band.

1-3) Mode 2-2

On the assumption that data is transmitted in M preferred subbands, the UE simultaneously selects the positions of M subbands and a single precoding matrix for the M subbands.

A CQI is generated for each codeword in the M subbands.

In addition, the UE generates a single wideband CQI for the system frequency band or the higher layer-set frequency band.

The UE transmits information about the positions of the M subbands, the single CQI value for the M subbands, a single PMI for the M subbands, a wideband PMI, and the wideband CQI value. The bandwidth of each subband and the M value may vary with the bandwidth of the system frequency band.

1-4) Mode 3-0

The UE generates a wideband CQI value.

On the assumption that data is transmitted in each subband, the UE generates a CQI value for each subband. Even though an RI is larger than 1, a CQI value is only for a first codeword.

1-5) Mode 3-1

The UE generates a single precoding matrix for the system frequency band or the higher layer-set frequency band.

The UE generates a CQI on a codeword basis on the assumption of the single precoding matrix for each subband.

The UE generates a wideband CQI on the assumption of a precoding matrix.

A CQI for each subband is a differential CQI value. The differential CQIs are the differences between indexes of CQI values for the respective subbands and an index of the wideband CQI.

The bandwidth of each subband may vary with the bandwidth of the system frequency band.

A description will be made below of a method for transmitting a CQI/PMI/RI on a PUCCH periodically.

2) Periodic CQI/PMI/RI Transmission on PUCCH

A CQI is transmitted periodically on a PUCCH. However, when a control signal requesting uplink data transmission is received, a CQI may be transmitted on a PUSCH. The periodic CQI/PMI/RI transmission is performed in one of the modes listed in Table 3 below, irrespective of whether the transmission is carried out via a PUCCH or a PUSCH.

TABLE 3

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In Table 3, a Bandwidth Part (BP) is a set of contiguous subbands that may cover the system frequency band or the higher layer-set frequency band in Mode 2-0 and Mode 2-1. The bandwidth of each subband, the bandwidth of each BP, and the number of BPs may vary with the bandwidth of the system frequency band. To cover the system frequency band or the high layer-set frequency band (set S), CQIs for the respective BPs are transmitted in an ascending order of frequency. According to CQI/PMI/RI combinations, four transmission types are defined. In Type 1, a subband CQI is transmitted in Mode 2-0 and Mode 2-1. A wideband CQI and a PMI are transmitted in Type 2, an RI is transmitted in Type 3, and a wideband CQI is transmitted in Type 4. When an RI and a wideband CQI/PMI are transmitted, they are transmitted in subframes with different periods and offsets. If the RI and the wideband CQI/PMI are to be transmitted in the same subframe, the wideband CQI/PMI is not transmitted.

If the transmission period of a subband CQI is P, a wideband CQI/PMI has a period of H×P where H=J×K+1. K is the total number of cycles of the BPs. That is, the wideband CQI/PMI is transmitted at time points {0, H, 2H, ... }. At J×K time points other than the wideband CQI/PMI transmission time points, the subband CQI is transmitted.

The period of an RI is an M multiple of the period of the wideband CQI/PMI. The offset between the RI and the wideband CQI/PMI is F. When the RI and the wideband CQI/PMI are supposed to be transmitted in the same subframe, the wideband CQI/PMI is not transmitted.

The parameters P, H, K and F are all determined and signaled by the higher layer.

The modes listed in Table 3 are described below.

2-1) Mode 1-0

If an RI is supposed to be transmitted, an RI is generated for the system frequency band or the higher layer-set frequency band and a Type-3 report is transmitted. When a CQI is supposed to be transmitted, a wideband CQI is transmitted.

2-2) Mode 1-1

If an RI is supposed to be transmitted, an RI is generated for the system frequency band or the higher layer-set frequency band and a Type-3 report is transmitted. When a CQI/PMI is supposed to be transmitted, a single precoding matrix is selected on the assumption of a latest transmitted RI. A Type-2 report specifying a wideband CQI, a single precoding matrix, a differential wideband CQI is transmitted.

2-3) Mode 2-0

If an RI is supposed to be transmitted, an RI is generated for the system frequency band or the higher layer-set frequency band and a Type-3 report is transmitted. When a wideband CQI is supposed to be transmitted, a wideband CQI is generated on the assumption of a latest transmitted RI and a Type-3 report is transmitted. If a CQI for a selected subband is supposed to be transmitted, the UE selects the most preferred subband from J BPs each having N subbands and transmits a Type-1 report. The Type-1 report may require one or more subframes according to the BPs.

2-4) Mode 2-1

If an RI is supposed to be transmitted, an RI is generated for the system frequency band or the higher layer-set frequency band and a Type-3 report is transmitted. When a wideband CQI is supposed to be transmitted, a wideband CQI is generated on the assumption of a latest transmitted RI and a Type-4 report is transmitted.

If a CQI for selected subbands is supposed to be transmitted, the UE generates differential value between a single CQI value for subbands selected from J BPs each having Nj subbands and CQI value for codewords, on the assumption of a latest transmitted PMI/RI, by a Type-1 report and transmits the differential value. If the RI is larger than 1, the UE generates the differential CQI values on the assumption of the latest transmitted RI and a single precoding matrix for the selected subbands, and transmits them by a Type-1 report.

Figure 6:
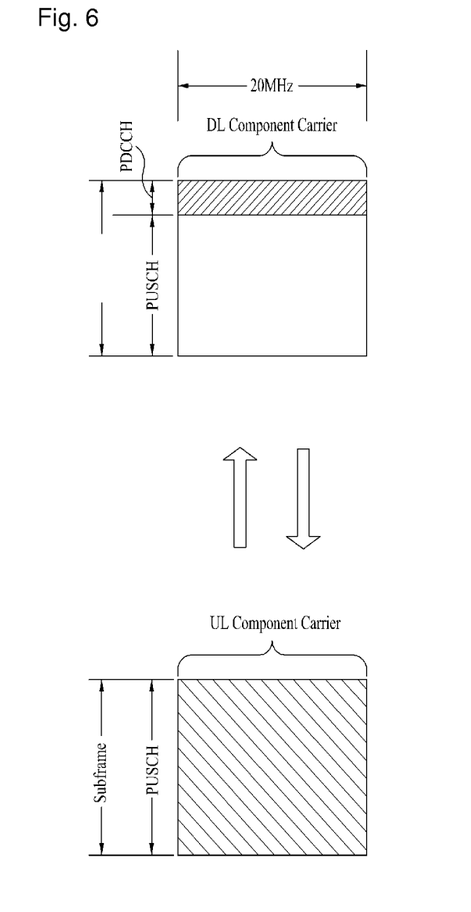
FIG. 6 illustrates transmission bands when each of a downlink and an uplink uses a single Component Carrier (CC)

FIG. 6 illustrates transmission bands when a single CC is used for each of a downlink and an uplink. The above-description applies when the downlink and the uplink each have one CC and uplink transmission of information about a downlink channel takes place in accordance with the mapping relationship between the single uplink CC and the single downlink CC. Since the downlink frequency band is mapped to the uplink frequency band, each having one CC, upon receipt of a CQI request in an uplink grant, a UE transmits channel information about a downlink channel on a scheduled PUSCH in a non-periodic CQI transmission mode set by the higher layer, as described before.

Figure 7:
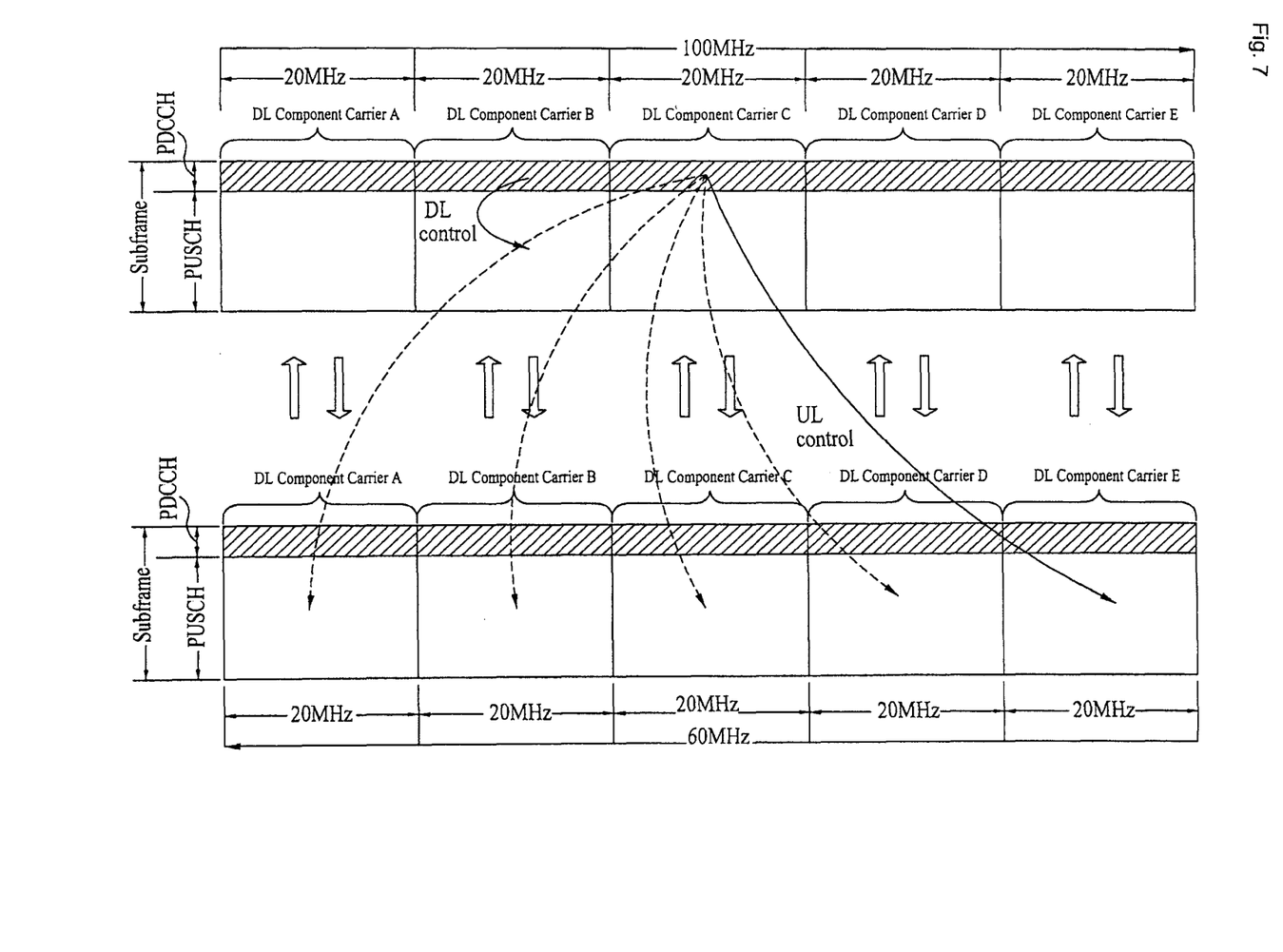
FIG. 7 illustrates transmission bands when each of a downlink and an uplink uses a plurality of (CCs)

FIG. 7 illustrates transmission bands when the downlink and the uplink each use a plurality of CC. In FIG. 7, the downlink CCs may be mapped to the uplink CCs in pairs. The pairs may be linked asymmetrically. For example, if there are two downlink CCs and one uplink CC, the downlink CCs may be mapped to the uplink CC at 2:1. These links may be static or semi-static. A PDCCH is transmitted in a PDCCH region of each CC, carrying control information for downlink and uplink scheduling. It is possible to schedule, via a PDCCH, a Physical Downlink Shared CHannel (PDSCH) in the same downlink CC or a Physical Uplink Shared CHannel (PUSCH) of an uplink CC linked to the downlink CC, or to schedule, via the PDCCH, downlink and uplink PDSCHs and PUSCHs irrespective of the downlink CC of the PDCCH or the uplink CC linked to the downlink CC. In the latter case, the scheduled uplink and downlink CCs are identified by Carrier Indicators (CIs).

As a plurality of CCs is configured for each of the downlink and uplink and thus the plurality of downlink CCs are available for simultaneous transmission and reception as illustrated in FIG. 7, there is a need for newly defining the configuration and meaning of a CQI request used for non-periodic CQI reporting, included in an uplink grant. Transmission of a CQI for each downlink CC whenever a CQI request is included in an uplink grant increases overhead. Therefore, it is proposed that a CQI request is configured to request reporting of a CQI for one CC in the present invention.

Embodiment 1

In accordance with an exemplary embodiment of the present invention, an indication explicitly indicating a downlink CC for which a CQI is to be reported is transmitted along with a CQI request on a PDCCH.

Figure 8:
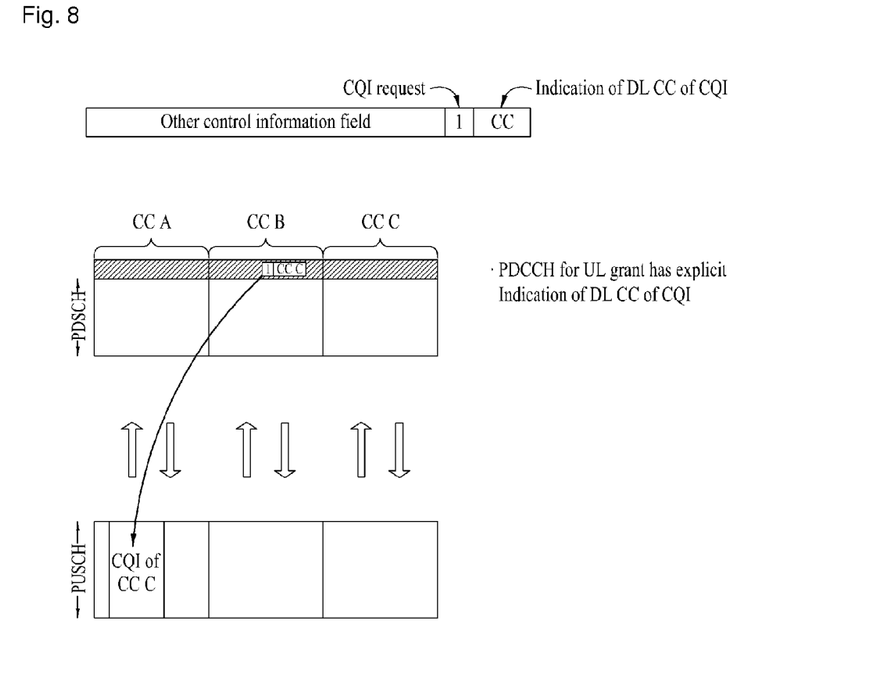
FIG. 8 illustrates the configuration of control information fields used to request CQI reporting and a CQI transmission method in a multi-carrier system according to an exemplary embodiment of the present invention.

FIG. 8 illustrates the structure of control information fields to request CQI reporting and a CQI transmission method in a multi-carrier system according to an exemplary embodiment of the present invention. According to a PDCCH configuration, a control signal may be configured such that a PDCCH carrying uplink grants for scheduling all uplink CCs is transmitted only in a predetermined downlink CC. In this case, a downlink CC requiring CQI reporting needs to be explicitly indicated by the PDCCH. This is necessary to select the downlink CC carrying the PDCCH including the uplink grants independently of selection of downlink CC requiring CQI reporting.

For example, given M downlink CCs, $$\lceil \log_2 M \rceil$$

bits may be allocated to indicate a downlink CC requiring CQI reporting, in addition to 1 bit for a CQI request. For more efficient bit configuration, $$\lceil \log_2(M+1) \rceil$$

bits may be used to represent M states indicating downlink CCs for which CQIs are to be reported and 1 state for indicating no CQI request state.

As illustrated in FIG. 8, control information fields of a PDCCH in a downlink CC, CC B include a 1-bit CQI request field and a field indicating a downlink CC for which a CQI is to be reported. In FIG. 8, an uplink grant indicates transmission of an uplink CC, CC A, the CQI request is set to 1, requesting CQI reporting, and the indication field indicates CC C as a downlink CC requiring CQI reporting. Upon receipt of this control information, the UE transmits a CQI for the downlink CC, CC C in the uplink CC, CC A.

Embodiment 2

In accordance with another exemplary embodiment of the present invention, a downlink CC requiring CQI reporting is implicitly indicated in a PDCCH carrying a CQI request.

Only a 1-bit CQI request per CC is used and a CQI is supposed to be reported for a downlink CC in which a PDCCH carrying an uplink grant is transmitted.

Figure 9:
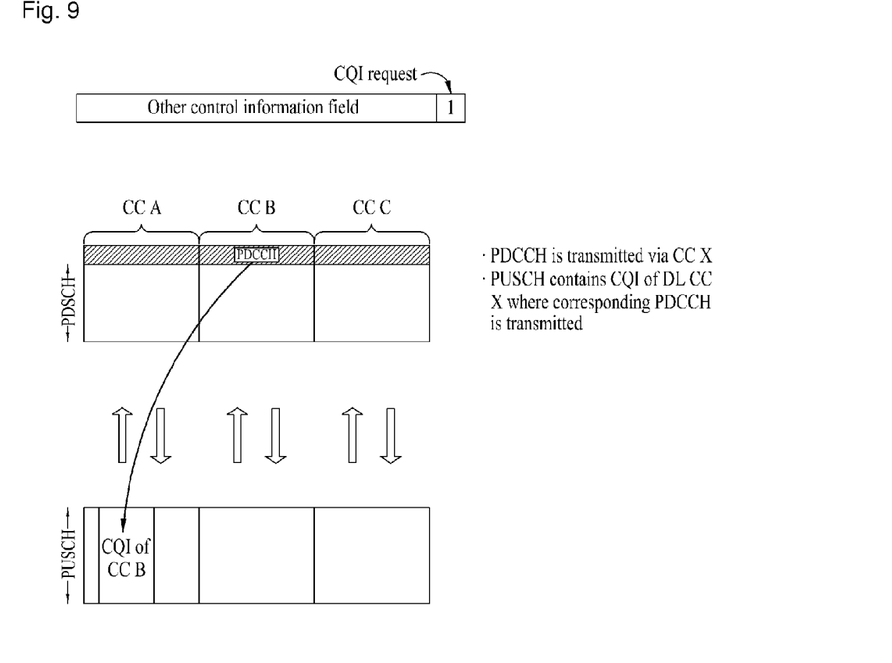
FIG. 9 illustrates the configuration of control information fields used to request CQI reporting and a CQI transmission method in the multi-carrier system according to another exemplary embodiment of the present invention.

FIG. 9 illustrates the structure of control information fields including a CQI request field and a CQI transmission method according to another exemplary embodiment of the present invention. Referring to FIG. 9, the control information fields includes a 1-bit CQI request field. If the CQI request field is set to 1, this implies that a CQI report is requested. Thus, upon receipt of the control information, the UE transmits a CQI for a downlink CC, CC B in which it has received a PDCCH carrying the uplink grant in an uplink CC scheduled by the uplink grant. This exemplary embodiment offers the benefits of still using a conventional signal format and reducing signaling overhead relative to Embodiment 1. However, to request CQI reporting for a specific downlink CC, a PDCCH including an uplink grant should be transmitted in the specific downlink CC.

Embodiment 3

In accordance with another exemplary embodiment of the present invention, a PDCCH includes a Carrier Indicator (CI). Thus when an uplink CC other than an uplink CC corresponding to a downlink CC carrying the PDCCH among a carrier aggregation is transmitted, a CQI is transmitted for a downlink CC corresponding to the scheduled uplink CC.

Figure 10:
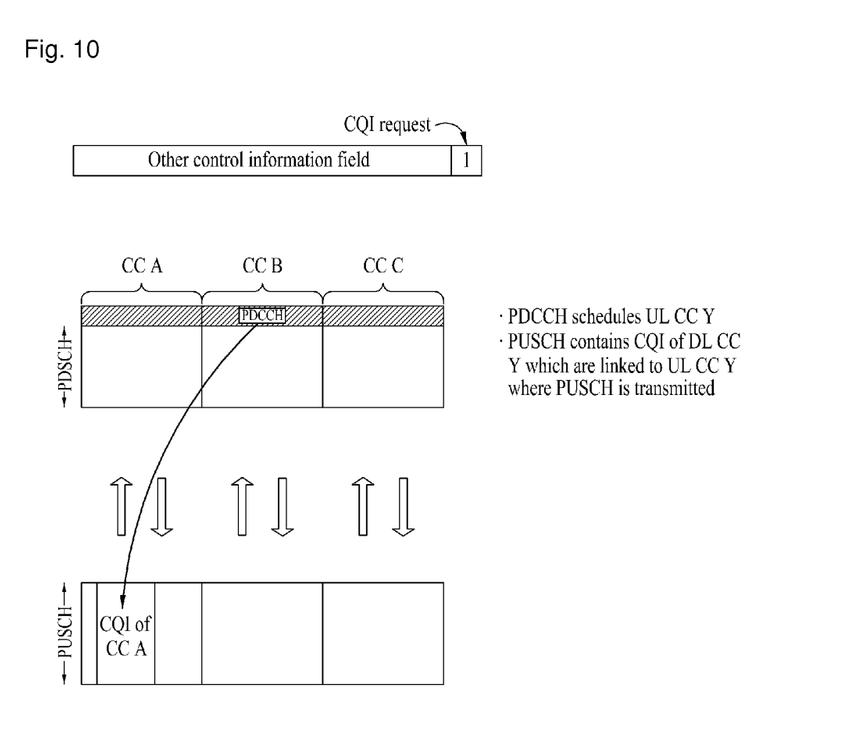
FIG. 10 illustrates a method for configuring control information for CQI reporting in the multi-carrier system according to another exemplary embodiment of the present invention.

FIG. 10 illustrates a method for configuring control information concerning CQI reporting in a multi-carrier system according to another exemplary embodiment of the present invention.

Referring to FIG. 10, control information fields include a 1-bit CQI request field. A PDCCH in a downlink CC, CC B includes a CI for uplink scheduling and the CI indicates an uplink CC, CC A. Upon receipt of the PDCCH, the UE transmits a CQI for the downlink CC, CC A corresponding to the uplink CC, CC A indicated by the CI on the PUSCH of the uplink CC, CC A. The uplink CC indicated by the CI and the downlink CC corresponding to the uplink CC may be paired by higher layer signaling such as broadcasting or RRC signaling.

Commonly in Embodiment 1, Embodiment 2 and Embodiment 3, a CQI is reported for a single CC in order to reduce the overhead of uplink CQI reporting. Therefore, to get knowledge of CQIs for total downlink CCs, a plurality of PDCCHs each including an uplink grant should be transmitted for each CC simultaneously or sequentially. However, if a channel environment is rapidly changing and thus CQIs for the whole CCs are updated frequently, CQI reporting for the entire CCs is requested preferably on one PDCCH, which will be described below.

Embodiment 4

Figure 11:
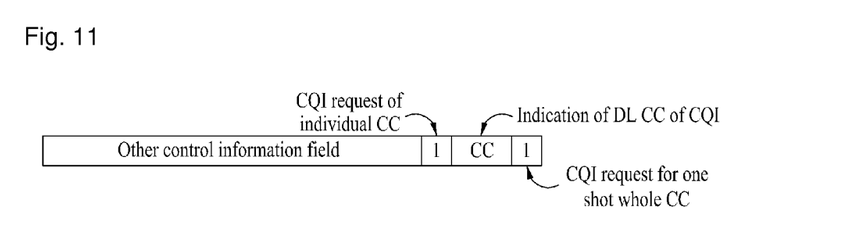
FIG. 11 illustrates the configuration of control information fields used to request CQI reporting in the multi-carrier system according to another exemplary embodiment of the present invention.

In this exemplary embodiment, Embodiment 1 is modified so that CQIs for entire CCs are requested on one PDCCH. Both explicit indication of a downlink CC requiring CQI reporting and requesting CQIs for whole CCs on one PDCCH may be supported. FIG. 11 illustrates the structure of control information fields for requesting CQI reporting in a multi-carrier system according to another exemplary embodiment of the present invention.

Referring to FIG. 11, given M downlink CCs, control information fields includes $\lceil \log_2 M \rceil$ bits field for indicating a downlink CC requiring CQI reporting, 1 bit field for indicating CQI request of individual CC, and 1 bit field for indicating CQI request of whole CCs (i.e., CQI request for one shot whole CC in FIG. 11), respectively.

Meanwhile, for more efficient bit configuration, $\lceil \log_2 (M+2) \rceil$ bits field may be used to represent M states indicating downlink CCs for which CQIs are to be reported, 1 state for indicating no CQI request state and 1 state for indicating a one-shot whole CC CQI request.

Embodiment 5

Figure 12:
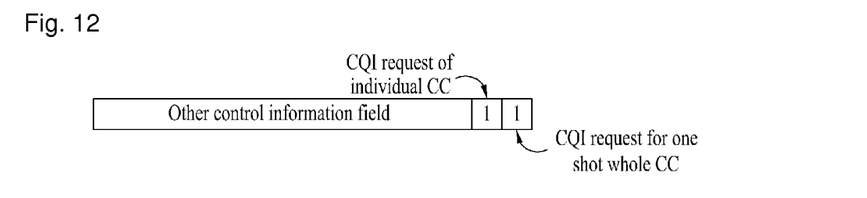
FIG. 12 illustrates the configuration of control information fields used to request CQI reporting in the multi-carrier system according to another exemplary embodiment of the present invention.

In this exemplary embodiment, Embodiment 2 and Embodiment 3 are modified so that CQIs for entire CCs are requested on one PDCCH. Both implicit indication of a downlink CC requiring CQI reporting and requesting CQIs for whole CCs on one PDCCH may be supported. FIG. 12 illustrates the structure of control information fields for requesting CQI reporting in a multi-carrier system according to another exemplary embodiment of the present invention.

Referring to FIG. 12, control information fields may include 1 bit field for indicating CQI request of individual CC which is indicated implicitly by the method of Embodiment 2 or Embodiment 3, and 1 bit field for requesting CQIs for whole CCs (i.e., CQI request for one shot whole CC in FIG. 12), respectively.

Meanwhile, for more efficient bit configuration, 2 bits field may be used to represent 1 sate for indicating CQI request of individual CC which is indicated implicitly by the method of Embodiment 2 or Embodiment 3, 1 state for indicating no CQI request state and 1 state for indicating CQI request for one-shot whole CC.

For non-periodic CQI transmission, there is a mode in which only a CQI is transmitted on a PUSCH without uplink payload according to the combination between the number of allocated Physical Resource Blocks (PRBs) and an MCS, and a CQI request. This transmission mode is referred to as a CQI-only transmission mode. Considering that CQI information for entire CCs is bursty, it may be better to transmit the CQI information without being multiplexed with payload data.

For example, upon receipt of a 1-bit CQI request as in a legacy system, the UE reports a CQI for each downlink CC in the presence of payload data to be transmitted on a PUSCH. Meanwhile, in the CQI-only transmission mode, the UE reports a CQI for whole downlink CCs in a multi-carrier system. The CQI-only transmission mode may be indicated by a combination of a specific number of allocated PRBs and a specific MCS, and a CQI request. Thus, any additional signaling bit requesting a CQI for whole CCs is not needed.

Figure 13:
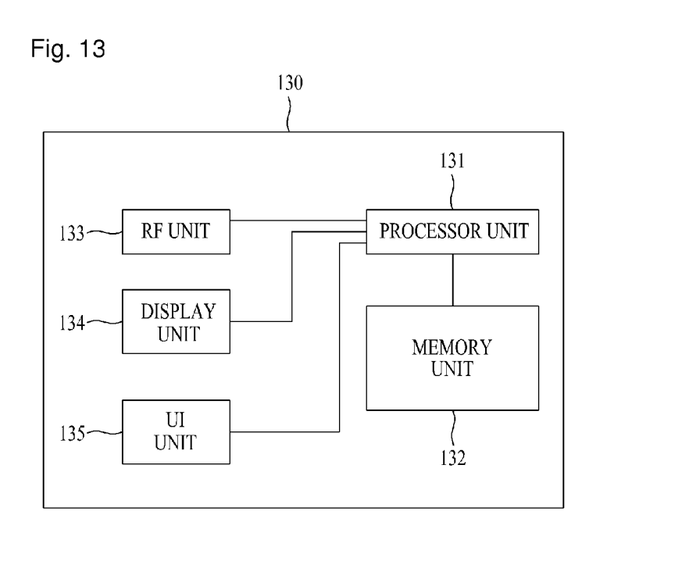
FIG. 13 is a block diagram of an apparatus that is applicable to a User Equipment (UE) or a Base Station (BS), for implementing the above exemplary embodiments of the present invention, according to a further exemplary embodiment of the present invention.

FIG. 13 is a block diagram of an apparatus which is applicable to a BS and a UE, for implementing the methods according to the exemplary embodiments of the present invention, according to a further exemplary embodiment of the present invention.

Referring to FIG. 13, an apparatus 130 includes a processor unit 131, a memory unit 132, a Radio Frequency (RF) unit 133, a display unit 134, and a User Interface (UI) unit 135. The processor unit 131 takes charge of physical interface protocol layers and provides a control plane and a user plane. The processor unit 131 may also perform the functionalities of each layer. The memory unit 132 is electrically connected to the processor unit 131 and stores an operating system, application programs, and general files. If the apparatus 130 is a UE, the display unit 134 may display a variety of information and may be implemented with a known Liquid Crystal Display (LCD), an Organic Light Emitting Diode (OLED), or the like. The UI unit 135 may be configured in combination with a known UI like a keypad, a touch screen, etc. The RF unit 133 is electrically connected to the processor unit 131, for transmitting and receiving RF signals.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

MODE FOR THE INVENTION

The exemplary embodiments of the present invention may be achieved by various means, for example, hardware, firmware, software, or a combination thereof. In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

INDUSTRIAL APPLICABILITY

The present invention is applicable to a UE, a BS or any other device in a wireless mobile communication system.

The invention claimed is:

1. A method for transmitting control information to request a Channel Quality Indicator (CQI) in a wireless communication system supporting a plurality of transmission bands, the method comprising:
   generating control information including downlink transmission band indication information and CQI request information, the downlink transmission band indication information indicating a downlink transmission band requiring CQI reporting among a plurality of downlink transmission bands and the CQI request information requesting CQI reporting for the downlink transmission band; and
   transmitting the generated control information on a downlink control channel of a predetermined downlink transmission band among the plurality of downlink transmission bands,
   wherein if the number of the plurality of downlink transmission bands is M, $[\log_2(M+1)]$ bits are allocated to the downlink transmission band indication information and the CQI request information, and [ ] represents a ceiling function.

2. A method for transmitting control information to request a Channel Quality Indicator (CQI) in a wireless communication system supporting a plurality of transmission bands, the method comprising:
   generating control information including downlink transmission band indication information and CQI request information, the downlink transmission band indication information indicating a downlink transmission band requiring CQI reporting among a plurality of downlink transmission bands and the CQI request information requesting CQI reporting for the downlink transmission band; and
   transmitting the generated control information on a downlink control channel of a predetermined downlink transmission band among the plurality of downlink transmission bands, wherein the control information further includes whole band CQI request information requesting a CQI for all of the plurality of downlink transmission bands, $[\log_2(M+2)]$ bits are allocated to the downlink transmission band indication information, the CQI request information, and the whole band CQI request information, and [ ] represents a ceiling function.

3. The method according to claim 1, wherein the CQI request information is one bit and if the one bit is set to 1, the CQI request information indicates request of CQI reporting.

4. The method according to claim 1, wherein the control information further includes whole band CQI request information requesting CQI information for all of the plurality of downlink transmission bands.

5. A Base Station (BS) in a wireless communication system supporting a plurality of transmission bands, the BS comprising:
   a processor unit configured to generate control information including downlink transmission band indication information and Channel Quality Indicator (CQI) request information, the downlink transmission band indication information indicating a downlink transmission band requiring CQI reporting among a plurality of downlink transmission bands and the CQI request information requesting CQI reporting for the downlink transmission band; and
   a Radio Frequency (RF) unit electrically connected to the processor unit, and configured to transmit the generated control information on a downlink control channel of a predetermined downlink transmission band among the plurality of downlink transmission bands, wherein if the number of the plurality of downlink transmission bands is M, $[\log_2(M+1)]$ bits are allocated to the downlink transmission band indication information and the CQI request information, and [ ] represents a ceiling function.

6. The BS according to claim 5, wherein the CQI request information is one bit and if the one bit is set to 1, the CQI request information indicates request of CQI reporting.

7. The BS according to claim 5, wherein the control information further includes whole band CQI request information requesting CQI information for all of the plurality of downlink transmission bands.

8. A Base Station (BS) in a wireless communication system supporting a plurality of transmission bands, the BS comprising:

a processor unit configured to generate control information including downlink transmission band indication information and Channel Quality Indicator (CQI) request information, the downlink transmission band indication information indicating a downlink transmission band requiring CQI reporting among a plurality of downlink transmission bands and the CQI request information requesting CQI reporting for the downlink transmission band; and a Radio Frequency (RF) unit electrically connected to the processor unit, and configured to transmit the generated control information on a downlink control channel of a predetermined downlink transmission band among the plurality of downlink transmission bands, wherein the control information further includes whole band CQI request information requesting a CQI for all of the plurality of downlink transmission bands, $[\log_2(M+2)]$ bits are allocated to the downlink transmission band indication information, the CQI request information, and the whole band CQI request information, and [ ] represents a ceiling function.

* * * * *